US012752769B2

(12) United States Patent
Lu et al.

(10) Patent No.: US 12,752,769 B2
(45) Date of Patent: Oct. 6, 2026

(54) MULTICORE HYBRID-ELECTRIC POWERTRAIN CONTROLLER

(71) Applicant: Pratt & Whitney Canada Corp., Longueuil (CA)

(72) Inventors: Xuening Lu, Oakville (CA); Kevin Nguyen, Montreal (CA); Eric Ostiguy, St. Basile-le-Grand (CA); Louis-Philippe Larose, St.-Sabine (CA); Carmine Lisio, Laval (CA)

(73) Assignee: Pratt & Whitney Canada Corp., Longueuil (CA)

( * ) Notice: Subject to any disclaimer, the term of this patent is extended or adjusted under 35 U.S.C. 154(b) by 247 days.

(21) Appl. No.: 18/774,676

(22) Filed: Jul. 16, 2024

(65) Prior Publication Data

US 2026/0021802 A1 Jan. 22, 2026

(51) Int. Cl.

| | |
|---|---|
| ***B60W 50/023*** | (2012.01) |
| ***B60L 3/00*** | (2019.01) |
| ***B60L 50/60*** | (2019.01) |
| ***B60W 10/06*** | (2006.01) |
| ***B60W 10/08*** | (2006.01) |
| ***B60W 20/50*** | (2016.01) |
| ***B64D 27/33*** | (2024.01) |
| *B60W 20/10* | (2016.01) |
| *B64D 31/09* | (2024.01) |
| *B64D 31/18* | (2024.01) |

(52) U.S. Cl.

CPC ........... *B60W 20/50* (2013.01); *B60L 3/0092* (2013.01); *B60L 50/60* (2019.02); *B60W 10/06* (2013.01); *B60W 10/08* (2013.01); *B60W 50/023* (2013.01); *B60W 20/10* (2013.01); *B60W 2510/0638* (2013.01); *B60W 2510/081* (2013.01); *B60W 2710/0644* (2013.01); *B60W 2710/081* (2013.01); *B64D 27/33* (2024.01); *B64D 31/09* (2024.01); *B64D 31/18* (2024.01); *F05D 2270/52* (2013.01)

(58) Field of Classification Search

CPC ....... B60L 3/0092; B60L 50/60; B60W 20/50; B60W 50/023; B60W 2050/0292; B64D 27/33; B64D 31/09; B64D 31/18

See application file for complete search history.

(56) References Cited

U.S. PATENT DOCUMENTS

| | | | |
|---|---|---|---|
| 8,292,770 | B2 | 10/2012 | Novikov |
| 10,907,494 | B2 | 2/2021 | Long et al. |
| 11,597,526 | B2 | 3/2023 | Mark et al. |

(Continued)

FOREIGN PATENT DOCUMENTS

| | | | |
|---|---|---|---|
| CN | 112947043 | A | 6/2021 |
| EP | 4378740 | A1 | 6/2024 |

OTHER PUBLICATIONS

European Search Report dated Nov. 20, 2025, in connection with European Patent Application No. 25190000.7, 8 pages.

*Primary Examiner* — Tinh T Dang

(57) ABSTRACT

A multicore hybrid-electric powertrain controller includes an electric motor control unit and a thermal engine control unit. The electric motor control unit and the thermal engine control unit can be connected by one or more serial connections and an analog/discrete connection. Each of the electric motor control unit and the thermal engine control unit include two processing channels, such as for redundancy and fallback protection.

20 Claims, 6 Drawing Sheets

(56) References Cited

U.S. PATENT DOCUMENTS

| | | | |
|---|---|---|---|
| 11,685,540 | B2 | 6/2023 | Mark et al. |
| 11,852,083 | B2 | 12/2023 | Chahal et al. |
| 11,952,139 | B2 | 4/2024 | Schenk et al. |
| 11,988,159 | B2 | 5/2024 | Detweiler et al. |
| 2015/0180309 | A1 | 6/2015 | Klemen et al. |
| 2019/0118828 | A1* | 4/2019 | Karandikar ............... B60L 3/04 |
| 2020/0062413 | A1* | 2/2020 | Feddersen .............. B64D 31/18 |
| 2021/0300405 | A1 | 9/2021 | Hyde et al. |
| 2023/0356731 | A1 | 11/2023 | Chen et al. |
| 2024/0043133 | A1 | 2/2024 | Giannini |

* cited by examiner

MULTICORE HYBRID-ELECTRIC POWERTRAIN CONTROLLER

TECHNICAL FIELD

This disclosure is generally directed to aircraft. More specifically, this disclosure is directed to a multicore controller and hybrid-electric powertrain for aircraft.

BACKGROUND

High-level design trends within aviation include a move towards increased electrification of systems, including propulsion systems. Hybrid powertrain systems often include a propulsor that is driven by an electric motor, which (like hybrid automobiles) can obtain driving power from a battery, a combustion engine, or a combination thereof. Hybrid powertrain systems offer intriguing possibilities for performance improvements in terms of efficiency and granular thrust control. Unlike combustion engines that are indirectly controlled by regulating the intake of air and fuel, electric motors are controlled more directly and can receive and implement more granular and more frequently modulated control inputs.

SUMMARY

This disclosure is directed to a multicore hybrid-electric powertrain controller.

In a first embodiment, a multicore hybrid-electric powertrain controller includes an electric motor control unit. The electric motor control unit includes a first electric motor control channel having a first controller of an electric motor and a first electric motor protection processor. The electric motor control unit also includes a second electric motor control channel having a second controller of the electric motor and a second electric motor protection processor. The electric motor control unit further includes a switching driver connected to the first electric motor control channel and the second electric motor control channel, where the switching driver is configured to provide control inputs determined in at least one of the first electric motor control channel or the second electric motor control channel to the electric motor. The multicore hybrid-electric powertrain controller also includes a thermal engine control unit. The thermal engine control unit includes a first engine control channel having a first thermal combustion engine controller and a first thermal engine protection processor. The thermal engine control unit also includes a second engine control channel having a second thermal combustion engine controller and a second thermal engine protection processor. The thermal engine control unit further includes an output drive connected to first engine control channel and the second engine control channel. The multicore hybrid-electric powertrain controller also includes a first serial connection between the electric motor control unit and the thermal engine control unit, where the first serial connection is configured to pass control inputs and sensor data between the thermal engine control unit and the electric motor control unit. The multicore hybrid-electric powertrain controller further includes a second serial connection between the electric motor control unit and the thermal engine control unit, where the second serial connection is configured to pass the control inputs and the sensor data between the thermal engine control unit and the electric motor control unit. In addition, the multicore hybrid-electric powertrain controller includes an analog/discrete connection between the electric motor control unit and the thermal engine control unit. The first and second serial connections between the electric motor control unit and the thermal engine control unit is configured, as an independent communication path and the redundancy of analog/discrete connection. The analog/discrete connection is configured, to provide faster protective functions, or responsive to failure of the first serial connection and the second serial connection, to pass the control inputs and the sensor data between the thermal engine control unit and the electric motor control unit.

Any single one or any combination of the following features may be used with the first embodiment. The switching driver may control a DC/AC inverter configured to power the electric motor. The DC/AC inverter may be a matrix inverter configured to power a plurality of motors under control of the electric motor control unit. The first electric motor control channel may be connected to the second electric motor control channel by one or more serial connections within the electric motor control unit. The first engine control channel may be connected to the second engine control channel by one or more serial connections within the thermal engine control unit. The first thermal combustion engine controller, the first thermal engine protection processor, the second thermal combustion engine controller, and the second thermal engine protection processor may include separate cores of a multicore processor. The first controller of the electric motor, the first electric motor protection processor, the second controller of the electric motor, and the second electric motor protection processor may include separate cores of the multicore processor. The first controller of the electric motor, the first electric motor protection processor, the second controller of the electric motor, and the second electric motor protection processor may operate at a first clock speed. The first thermal combustion engine controller, the first thermal engine protection processor, the second thermal combustion engine controller, and the second thermal engine protection processor may operate at a second clock speed. The first clock speed may be ten or more times that of the second clock speed. At least one of the first serial connection and the second serial connection may be a controller area network bus (CAN-BUS) connection. The electric motor control unit may be configured, responsive to detecting an error in one or more of the first controller of the electric motor or the first electric motor protection processor, to switch control of the electric motor from the first electric motor control channel to the second electric motor control channel. Upon detection of an error condition in one or more of a thermal combustion engine or the electric motor, at least one of the first thermal engine protection processor or the second thermal engine protection processor may be configured to output a kill command to at least one of the thermal combustion engine or the electric motor. Upon detection of the error condition in one or more of the thermal combustion engine or the electric motor, at least one of the first electric motor protection processor or the second electric motor protection processor may be configured to output the kill command to at least one of the thermal combustion engine or the electric motor.

In a second embodiment, a hybrid-electric powertrain includes a first electric motor, one or more motor sensors configured to obtain sensor data of the electric motor, a thermal combustion engine, one or more engine sensors configured to obtain sensor data of the thermal combustion engine, and a multicore hybrid-electric powertrain controller. The multicore hybrid-electric powertrain controller includes an electric motor control unit. The electric motor control unit includes a first electric motor control channel having a first controller of the first electric motor and a first electric motor protection processor. The electric motor control unit also includes a second electric motor control channel having a second controller of the first electric motor and a second electric motor protection processor. The electric motor control unit further includes a switching driver connected to the first electric motor control channel and the second electric motor control channel, where the switching driver is configured to provide control inputs determined in at least one of the first electric motor control channel or the second electric motor control channel to the first electric motor. The multicore hybrid-electric powertrain controller also includes a thermal engine control unit. The thermal engine control unit includes a first engine control channel having a first thermal combustion engine controller and a first thermal engine protection processor. The thermal engine control unit also includes a second engine control channel having a second thermal combustion engine controller and a second thermal engine protection processor. The thermal engine control unit further includes an output drive connected to first engine control channel and the second engine control channel. The multicore hybrid-electric powertrain controller also includes a first serial connection between the electric motor control unit and the thermal engine control unit, where the first serial connection is configured to pass control inputs and sensor data between the thermal engine control unit and the electric motor control unit. The multicore hybrid-electric powertrain controller further includes a second serial connection between the electric motor control unit and the thermal engine control unit, where the second serial connection is configured to pass the control inputs and the sensor data between the thermal engine control unit and the electric motor control unit. In addition, the multicore hybrid-electric powertrain controller includes an analog/discrete connection between the electric motor control unit and the thermal engine control unit. The first and second serial connections between the electric motor control unit and the thermal engine control unit is configured, as an independent communication path and the redundancy of analog/discrete connection. The analog/discrete connection is configured, to provide faster protective functions, or responsive to failure of the first serial connection and the second serial connection, to pass the control inputs and the sensor data between the thermal engine control unit and the electric motor control unit.

Any single one or any combination of the following features may be used with the second embodiment. The powertrain may include a DC/AC inverter configured to power the first electric motor. The powertrain may include a second electric motor, where the DC/AC inverter is a matrix inverter configured to power the first electric motor and the second electric motor. The first electric motor control channel may be connected to the second electric motor control channel by one or more serial connections within the electric motor control unit. The first engine control channel may be connected to the second engine control channel by one or more serial connections within the thermal engine control unit. The first thermal combustion engine controller, the first thermal engine protection processor, the second thermal combustion engine controller, and the second thermal engine protection processor may include separate cores of a multicore processor. The first controller of the first electric motor, the first electric motor protection processor, the second controller of the first electric motor, and the second electric motor protection processor may include separate cores of the multicore processor. The first controller of the first electric motor, the first electric motor protection processor, the second controller of the first electric motor, and the second electric motor protection processor may operate at a first clock speed. The first thermal combustion engine controller, the first thermal engine protection processor, the second thermal combustion engine controller, and the second thermal engine protection processor may operate at a second clock speed. The first clock speed may be ten or more times that of the second clock speed. At least one of the first serial connection and the second serial connection may be a CANBUS connection. The electric 20 motor control unit may be configured, responsive to detecting an error in one or more of the first controller of the first electric motor or the first electric motor protection processor, to switch control of the first electric motor from the first electric motor control channel to the second electric motor control channel. Upon detection of an error condition in one or more of the thermal combustion engine or the first electric motor, at least one of the first thermal engine protection processor or the second thermal engine protection processor may be configured to output a kill command to at least one of the thermal combustion engine or the first electric motor. Upon detection of the error condition in one or more of the thermal combustion engine or the first electric motor, at least one of the first electric motor protection processor or the second electric motor protection processor may be configured to output the kill command to at least one of the thermal combustion engine or the first electric motor.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1A:
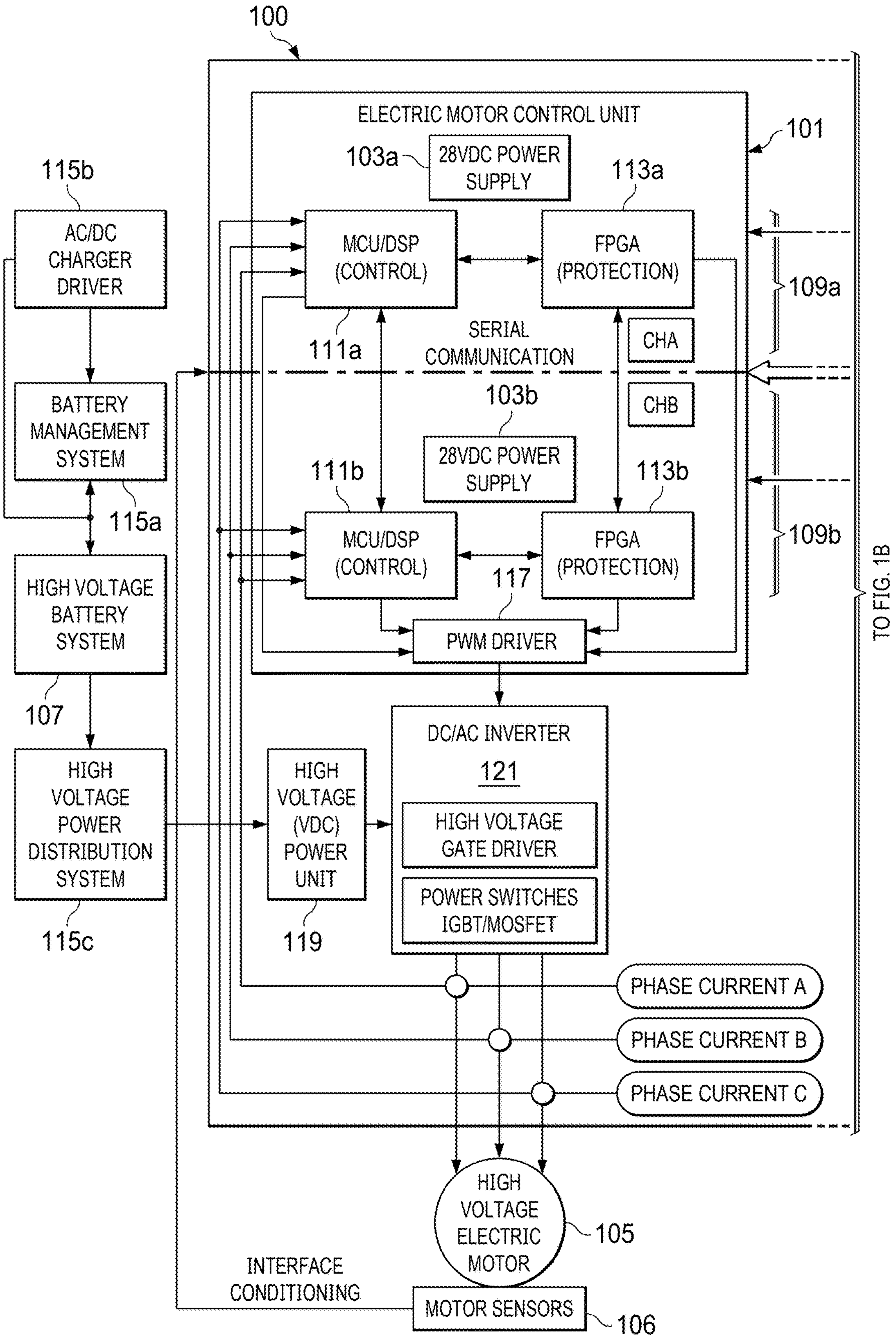
FIGS. 1A and 1B illustrate an example hybrid-electric powertrain incorporating a multicore hybrid-electric controller according to various embodiments of this disclosure.

FIGS. 1A through 3B, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

As described above, high-level design trends within aviation include a move towards increased electrification of systems, including propulsion systems. Hybrid powertrain systems often include a propulsor that is driven by an electric motor, which (like hybrid automobiles) can obtain driving power from a battery, a combustion engine, or a combination thereof. Hybrid powertrain systems offer intriguing possibilities for performance improvements in terms of efficiency and granular thrust control. Unlike combustion engines that are indirectly controlled by regulating the intake of air and fuel, electric motors are controlled more directly and can receive and implement more granular and more frequently modulated control inputs.

Hybrid-electric aircraft powertrains appear to offer promising improvements over purely combustion-based powertrains across multiple dimensions of performance, including improved efficiencies, reduced emissions, and more granular control over propulsion motors. Unfortunately, implementing hybrid powertrain systems presents complexity and weight challenges, particularly at the controller level. Controllers for such systems often need to operate at dissimilar control rates of the electric and combustion systems, such as when electric systems can be controlled at high frequencies while combustion engine systems require slower pacing of control inputs. Moreover, controllers for such systems often need to ensure the requisite level of system redundancy for aircraft control systems. Accordingly, developing control systems for hybrid-electric powertrains that provide the requisite performance and system redundancy without incurring weight penalties remains a source of technical challenges and opportunities for improvement. Embodiments of this disclosure include multicore controllers that simultaneously address the need for redundancy, control of heterogeneous systems, and integration in control systems for hybrid-electric aircraft powertrains.

FIGS. 1A through 3B illustrate three examples of hybrid-electric powertrains and hybrid-electric powertrain controllers according to this disclosure. For consistency and convenience of cross-reference, elements common to more than of FIGS. 1A-3B are numbered similarly. Attention is also drawn to the fact that, for each of FIGS. 1A-3B, the “A” and “B” portions for each number are intended to be viewed together.

As discussed elsewhere in this disclosure, controlling a hybrid-electric aviation powertrain presents a host of technical challenges, including, without limitation, the need for layered redundancy in a critical control system, minimizing weight, and avoiding energy waste from overclocking processors responsible for managing functions of a thermal combustion engine.

Figure 1B:
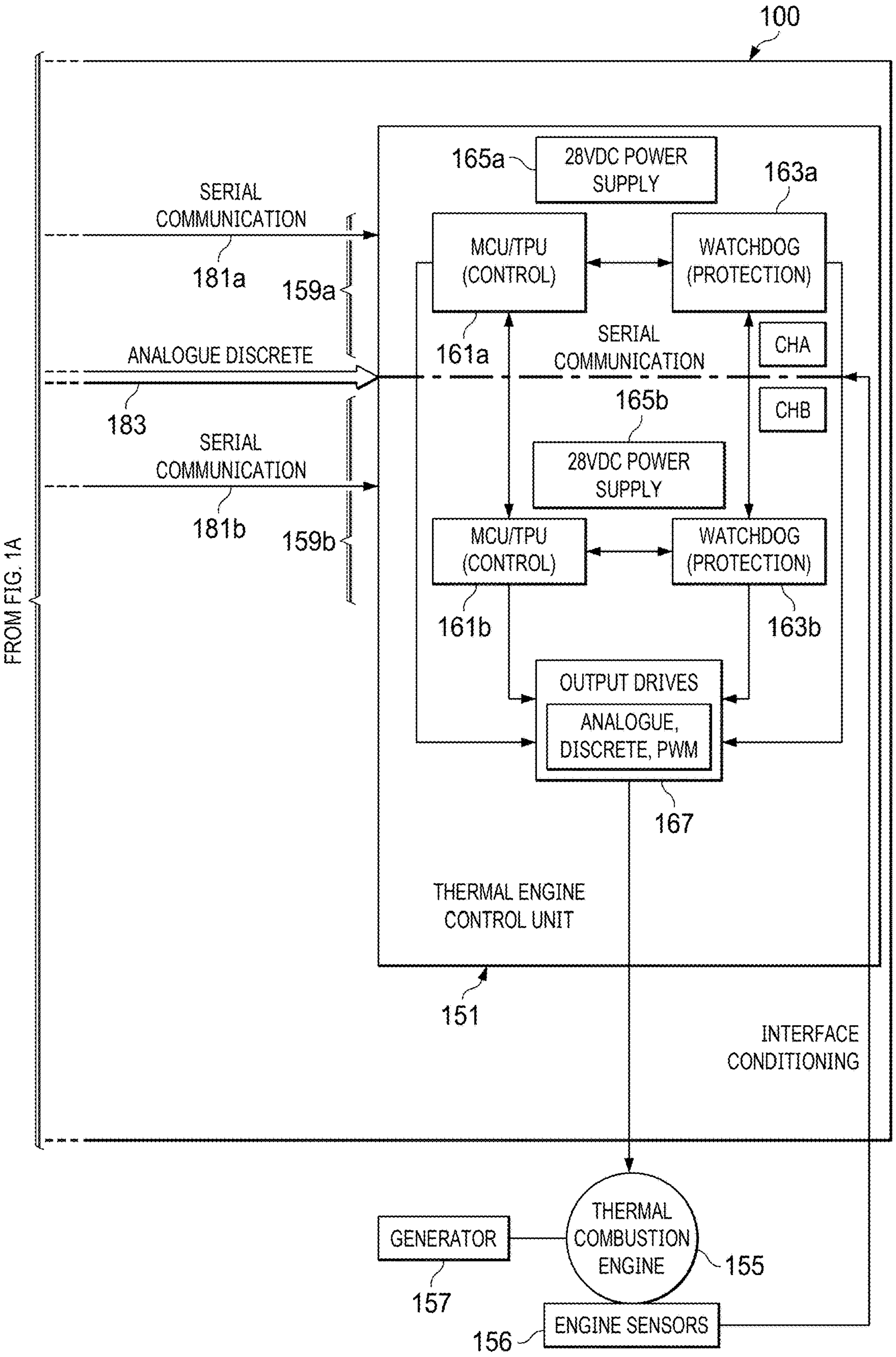

Referring to the illustrative example of FIGS. 1A and 1B, a first example of a multicore hybrid-electric powertrain controller 100 according to embodiments of this disclosure is shown. In this example, controller 100 manages the operations of, at a minimum, an electric motor 105 and a thermal combustion engine 155. Electric motor 105 can be a high-power (for example, 50-100 KW or greater) AC motor driving one or more propulsors of an aircraft. In certain embodiments, such as described with reference to FIGS. 2A through 3B, controller 100 can control the operation of a plurality of electric motors. Thermal combustion engine 155 can be any engine which produces rotary power through the combustion of a fuel stock, including, without limitation, a turbofan engine, a gas turbine, or a reciprocating piston engine. Thermal combustion engine 155 is, at a minimum, connected to, and drives one or more electrical generators 157, which produce an electrical current which can provided to a bus on the aircraft. The generated electricity can be used to charge a high voltage battery 107 and, depending on the operating conditions, power other systems of the aircraft. Additionally, in some embodiments, thermal combustion engine 155 can, in addition to powering generator 157, contribute to propelling the aircraft.

To achieve the requisite redundancy for aviation applications, while at the same time, ensuring that control systems for electric motor 105 and thermal combustion engine 155 do not waste power due to overclocking the control systems for thermal combustion engine at the rates used to control electric motor 105 and battery 107, controller 100 employs a bifurcated architecture, including an electric motor control unit 101, and a thermal engine control unit 151, wherein electric motor control unit 101 and thermal engine control unit 151 include two discrete processors or sets of processors, connected by a plurality of communication links. The processor or processors of electric motor control unit 101 operate at a first clock rate, wherein the first clock rate is appropriate for digital signal processing—for example, 20 KHz. In certain embodiments, the processor or processors of thermal engine control unit 151 can operate at lower clock rates (for example, KHz) of $1/10^{th}$ or less than the clock rate of the electric motor control unit 101. Additionally, or alternatively, thermal engine control unit 151 can include one or more timing processing units (TPUs), which include application-specific integrated circuits perform complex timing and I/O management independently.

As shown in the figures, to contribute to the redundancy and failure safety of the system as a whole, electric motor control unit 101 employs a split architecture, including a first electric motor control channel 109*a* and a second electric motor control channel 109*b*, including a matched set of components. As shown in the figures, first electric motor control channel 109*a* includes a first power supply 103*a*, which can include one or more batteries and power conditioning circuitry to ensure that first electric motor control channel 109*a* is provided a continuous supply of DC power at a set voltage (for example 28 volts). Second electric motor control channel 109*b* is likewise provided with a counterpart second power supply 103*b*.

First electric motor control channel 109*a* comprises at least two processing cores, a first electric motor controller 111*a* and a first electric motor protection processor 113*a*. First electric motor controller 111*a* can be implemented as a standalone digital signal processing (DSP) chip and first electric motor protection processor 113*a* can be implemented as a pre-programmed field programmable gate array. Alternatively, first electric motor protection processor 113*a* and first electric motor controller 111*a* can be implemented as separate processing cores of a multicore processing chip. First electric motor controller can be configured to receive the output from one or more sensors 106 (for example, rotational speed and torque sensors) of electric motor 105, as well as power data (for example, current values at each of phase of an AC power signal being provided to electric motor 105. Further, as shown in the figure, first electric motor controller 111*a* is communicatively connected (for example, through a serial connection) to first electric motor protection processor 113*a*, and to second electric motor controller 111*b*. First electric motor controller 111*a* is configured to execute instructions for managing the operation of electric motor 105 based, at a minimum, the outputs of motor sensors 106, data received from thermal engine control unit 151, and first electric motor protection processor 113*a*. Additionally, first electric motor controller 111*a* can receive data from one or more of the components managing the supply and distribution of power from battery 107. As shown in the figure, first electric motor controller provides control inputs to switching driver 117, which in this case, is a pulse width modulation (controller) which controls the modulation of a high voltage DC input 119 at a power-switched DC/AC inverter. Put differently, switching driver 117 converts control inputs from first electric motor controller 111*a* to waveforms of a multiphase AC power supplied to electric motor 105. Given the fast processor speeds of electric motor control unit 101 and that switching driver 117 can provide digital inputs defining the power waveforms generated by inverter 121, electric motor control unit 101 can exercise granular, rapidly-tunable control over electric motor 105. From a performance and efficiency perspective, this level of granular, rapidly-tunable control over the operation electric motor 105 is desirable, in that the operation of electric motor 105 can be continuously tuned to match operating conditions in ways that are difficult, if not impossible to achieve with thermal combustion engines, wherein the control inputs (for example, adjusting the fuel supply) are indirect and present latency issues associated with inertia in the spinning parts of the engine.

First electric motor control channel 109*a* further includes a first electric motor protection processor 113*a*. First electric motor protection processor includes a processor, field programmable gate array, or other medium for executing stored logical commands that, in response to detecting an error condition at one or more of electric motor 105 or thermal combustion engine 155, is configured to send a kill command to shut off the component(s) associated with the error condition.

As shown in the figure, the components, inputs, and outputs of first electric motor control channel 109*a* are fully mirrored by second electric motor control channel 109*b*, such that second electric motor control channel 109*b* provides a comprehensive backup of first electric motor control channel 109*a*. Further, electric motor control unit 101 is configured such that, upon detection of an error in one or more of first electric motor controller 111*a* or first electric motor protection processor 113*a*, control of electric motor is shifted from first electric motor control channel 109*a* to second electric motor control channel 109*b*. Similarly, if an operating error is detected in one or more components of second electric motor control channel 109*b*, electric motor control unit 101 switches control over electric motor 105 to first electric motor control channel 109*a*. In this way, complete redundancy of the control logic and failsafe protections for electric motor 105 can be achieved in a single multicore processor.

Thermal engine control unit 151, which is primarily responsible for managing the operation of thermal combustion engine 155, provides the second half of the bifurcated controller architecture shown in FIGS. 1A-3B. Referring to the illustrative examples shown in the figures, thermal engine control unit 151, like electric motor control unit 101, utilizes a double control channel architecture to provide redundancy and fallback protection. Thermal engine control unit 151 includes a first engine control channel 159*a* and a second engine control channel 159*b*. As with electric motor control unit 101, thermal engine control unit 151 is configured such that upon detection of an error condition in a component of one of first engine control channel 159*a* or second engine control channel 159*b*, management of thermal combustion engine 155 is switched over to the engine control with no components showing error conditions.

First engine control channel 159*a* includes a first thermal combustion engine controller 161*a*, first thermal engine protection processor 163*a*, and first power supply 165*a*. First power supply 165*a* can be a battery, power conditioner (for example, an electrical surge suppressor), rectifier, or other apparatus which guarantees that the components of thermal engine control unit 151 are provided with a continuous supply of DC power at a specified voltage (for example, 28 volts). First thermal combustion engine controller 161*a* can be an application-specific integrated circuit, a timing processing unit (TPU), or other, low-power processor capable of providing control inputs for thermal combustion engine 155 and operating at a slower clock speed (for example, approximately 1/10th) that of electric motor control unit 101. As noted elsewhere in this disclosure, the combination of the indirectness of the control inputs to a combustion engine, and the inertia of the rotating parts of the engine limit the timescales on which changes in the operation of thermal combustion engine 155 can be made. First thermal combustion engine controller 161*a* is configured to receive, at a minimum, engine sensor data (for example, engine temperature and speed data) from engine sensor 156 and execute control logic for thermal combustion engine 155 based on the engine sensor data. Depending on embodiments (for example, embodiments in which thermal combustion engine 155 not only powers generator 157, but also propels the aircraft), first thermal combustion engine controller 161 can receive inputs from other systems of the aircraft. As shown in the figures, first thermal combustion engine controller 161*a* provides control inputs to thermal combustion engine 155 via output drive 167, which encodes digital control signals from first thermal combustion engine controller 161*a* (and its mirror, second thermal combustion engine controller 161*b*) into the signal formats used by thermal combustion engine 155. Depending on the constituent componentry of thermal combustion engine 155, output drive 167 may encode control signals from first thermal combustion engine controller 161*a* as one or more of analog control signals, or pulse width modulation (PWM) control signals.

First engine control channel 159*a* further includes a first thermal engine protection processor 163*a*, which can be purpose-specific ASIC, or a core of a multicore processor. As with first and second electric motor protection processor, first thermal engine protection processor 163*a* is configured to implement error management logic and, upon detection of an error in one or more of thermal combustion engine 155, electric motor 105, or related systems (for example, battery 107), issue a kill command to shut down the system producing the error. As shown in the figures, first engine control channel 159*a* is connected via serial connections to the mirror set of components of second engine control channel 159*b*. Second engine control channel 159 includes a duplicate set of the components of first engine control channel 159*a* and utilizes the same inputs and provides the same outputs as first engine control channel 195*a*. According to certain embodiments, first thermal combustion engine controller 161*a*, first thermal engine protection processor 163*a*, second thermal combustion engine controller 161*b* and second thermal engine protection processor 163*b* can include separate cores of a single multicore processor.

According to various embodiments, the operation of electric motor 105 and the operation of thermal combustion engine 155 can be synchronized, such that the control logic for electric motor 105 implemented by first and second electric motor controllers 111*a-b* is dependent, at least in part, on control inputs provided to thermal combustion engine 155 or data obtained from engine sensors 156. Similarly, the control logic executed by first and second thermal combustion engine controllers 161*a-b* can depend on, at least in part, on control inputs provided to electric motor 105 by first and second electric motor controllers 111*a-b* or the outputs of electric motor sensors 106. Thus, in addition to multiple, redundant control channels within each of electric motor control unit 101 and thermal engine control unit 151, controller 100 includes a suite of multiple, redundant two-way connections for passing sensor data and control inputs between electric motor control unit 101 and thermal engine control unit 151.

As shown in the figure, controller 100 includes a first serial connection 181*a*, which provides two-way communication of control inputs (such as inputs for controlling electric motor 105 or thermal combustion engine 155) as well as sensor data (for example, outputs of motor sensors 106 and engine sensors 156). In some embodiments, first serial connection 181*a* can be a controller area network bus (CANBUS) connection.

To ensure redundancy and fallback coverage, a second serial connection 181*b* mirroring the specification of first serial connection is also provided, such that, if first serial connection 181*a* is rendered inoperative, control inputs and sensor data can be passed between electric motor control unit 101 and thermal engine control unit 151 via second serial connection 181*b*. Similarly, in the event that second serial connection 181*b* is rendered inoperative, controller 100 is configured to route control inputs and sensor data between electric motor control unit and thermal engine control unit 151 via first serial connection 181*a*.

Additionally, a discrete analog connection 183 can be provided as a further failsafe connection between electric motor control unit 101 and thermal engine control unit 151, for exchanging kill commands originated by one or more of protection processors 113*a*, 113*b*, 163*a* or 163*b*. According to certain embodiments, discrete analog connection 183 can pass signals faster than first and second serial connections 181*a* and 181*b*, which in certain embodiments, can be configured as backups or fallback connections in the event that discrete analog connection 183 becomes inoperative.

Figure 2A:
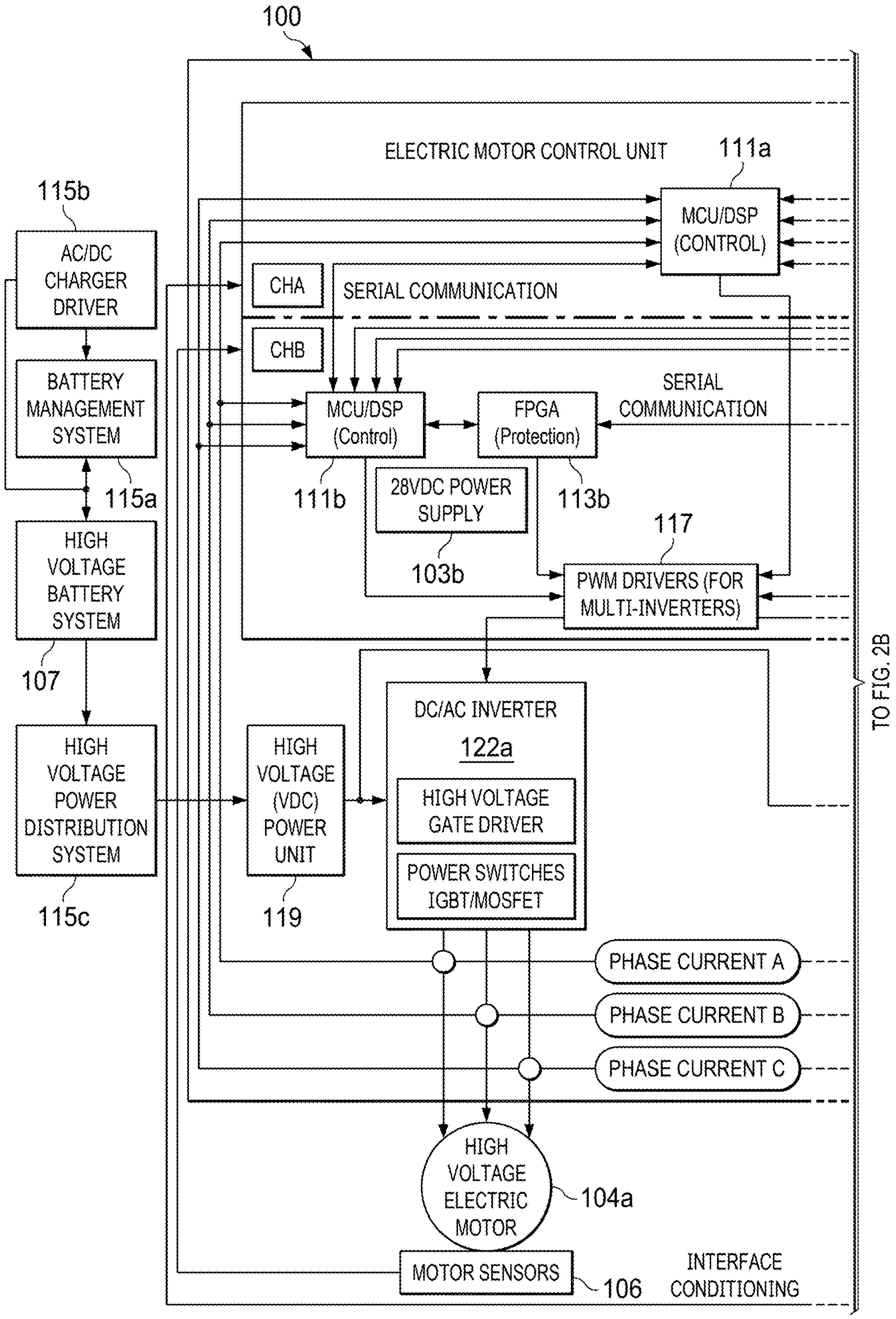
FIGS. 2A and 2B illustrate another example hybrid-electric powertrain incorporating a multicore hybrid-electric controller according to various embodiments of this disclosure.
Figure 2B:
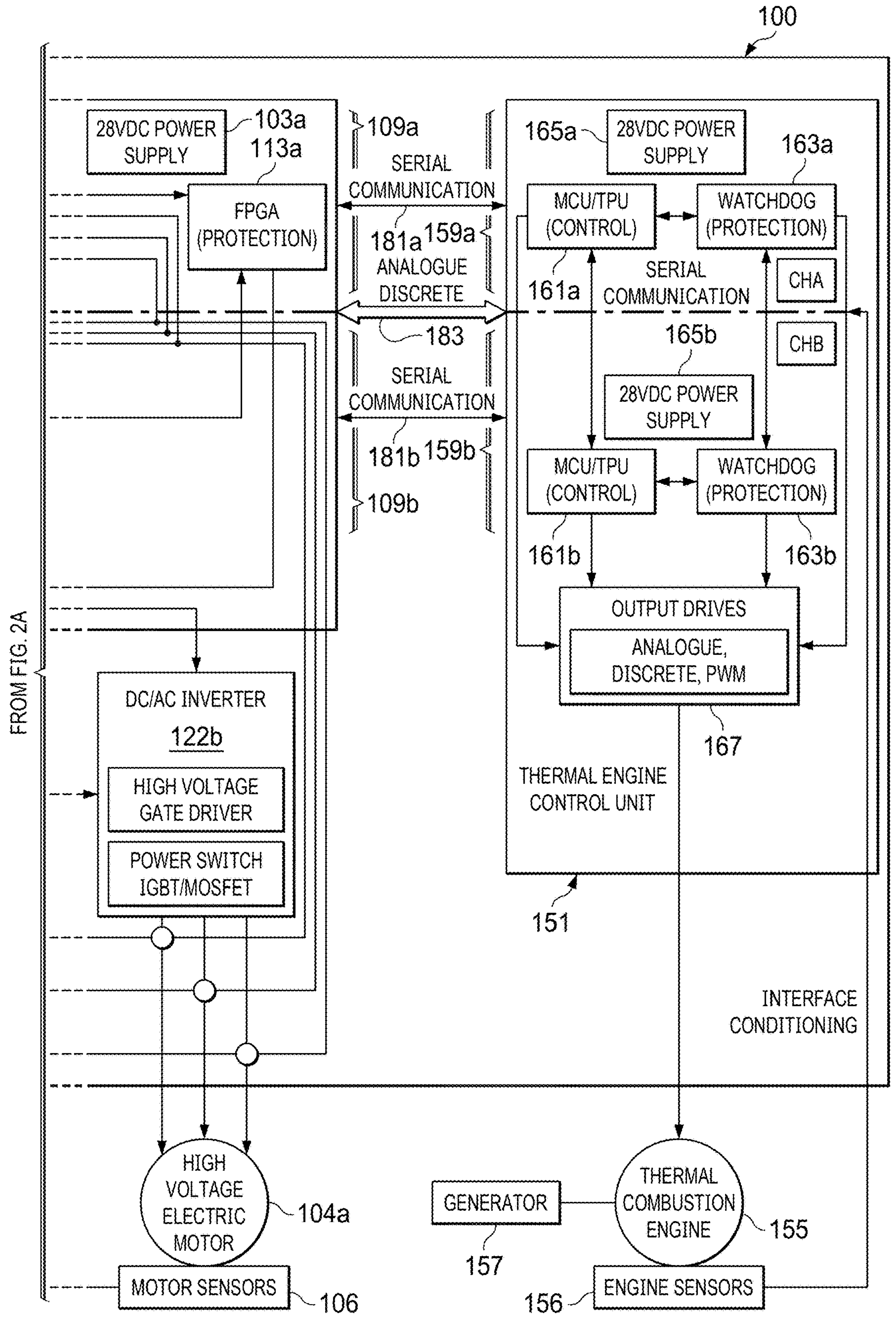
Figure 3A:
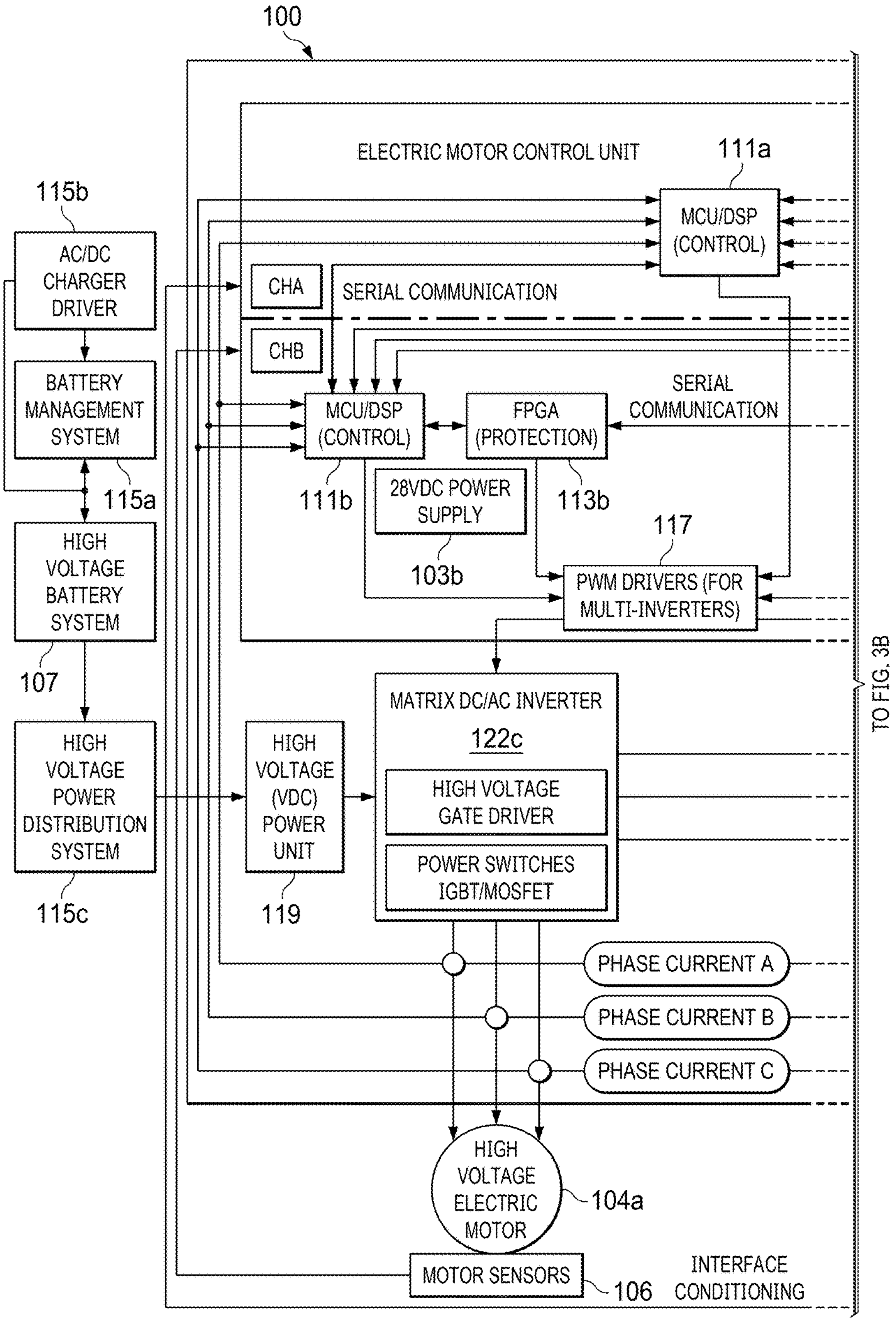
FIGS. 3A and 3B illustrate another example hybrid-electric powertrain incorporating a multicore hybrid-electric controller according to various embodiments of this disclosure.
Figure 3B:
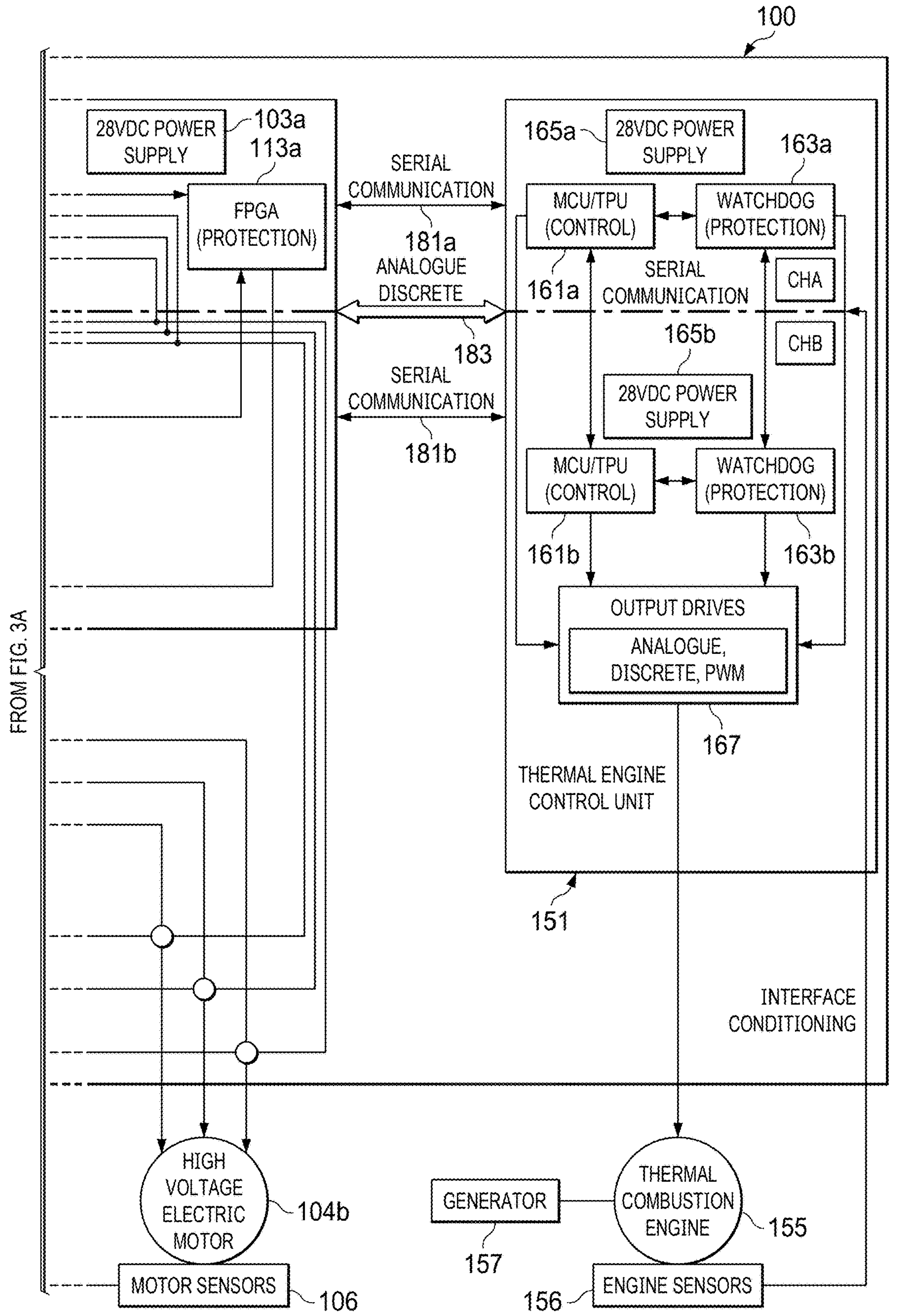

FIGS. 1A and 1B provide one, non-limiting example of controller 100, and embodiments according to this disclosure encompass variations and extensions of the architecture shown in FIGS. 1A-1B. For example, and as shown in FIGS. 2A-2B, electric motor control unit 101 can provide control inputs governing the inputs of multiple electric motors (for example, first motor 104*a* and second motor 104*b*), via a first DC/AC inverter 122*a* and a second DC/AC inverter 122*b*. Similarly, and as shown in FIGS. 3A-3B the multi-motor architecture of FIGS. 2A-2B can be further modified by incorporating matrix inverter 122*c*, which can generate AC phase currents for multiple electric motors.

Alternatively, or additionally, electric motor control unit can control the operation of a plurality of electric motors by providing control signals through a matrix DC/AC inverter 122*c*, which provides AC power waveforms to both of electric motors 104*a* and 104*b*.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive (HDD), a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112 (f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112 (f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A multicore hybrid-electric powertrain controller comprising:

an electric motor control unit comprising:

a first electric motor control channel comprising a first controller of an electric motor and a first electric motor protection processor;

a second electric motor control channel comprising a second controller of the electric motor and a second electric motor protection processor; and a switching driver connected to the first electric motor control channel and the second electric motor control channel, wherein the switching driver is configured to provide control inputs determined in at least one of the first electric motor control channel or the second electric motor control channel to the electric motor;

a thermal engine control unit comprising:

a first engine control channel comprising a first thermal combustion engine controller and a first thermal engine protection processor;

a second engine control channel comprising a second thermal combustion engine controller and a second thermal engine protection processor; and an output drive connected to first engine control channel and the second engine control channel;

a first serial connection between the electric motor control unit and the thermal engine control unit, wherein the first serial connection is configured to pass control inputs and sensor data between the thermal engine control unit and the electric motor control unit;

a second serial connection between the electric motor control unit and the thermal engine control unit, wherein the second serial connection is configured to pass the control inputs and the sensor data between the thermal engine control unit and the electric motor control unit; and an analog/discrete connection between the electric motor control unit and the thermal engine control unit; and the first and second serial connections between the electric motor control unit and the thermal engine control unit is configured, as an independent communication path and the redundancy of analog/discrete connection; and the analog/discrete connection is configured, to provide faster protective functions, or responsive to failure of the first serial connection and the second serial connection, to pass the control inputs and the sensor data between the thermal engine control unit and the electric motor control unit.

2. The controller of claim 1, wherein the switching driver is configured to control a DC/AC inverter configured to power an electric motor.

3. The controller of claim 2, wherein the DC/AC inverter is a matrix inverter configured to power a plurality of motors under control of the electric motor control unit.

4. The controller of claim 1, wherein:

the first electric motor control channel is connected to the second electric motor control channel by one or more serial connections within the electric motor control unit; and the first engine control channel is connected to the second engine control channel by one or more serial connections within the thermal engine control unit.

5. The controller of claim 4, wherein the first thermal combustion engine controller, the first thermal engine protection processor, the second thermal combustion engine controller, and the second thermal engine protection processor comprise separate cores of a multicore processor.

6. The controller of claim 5, wherein the first controller of the electric motor, the first electric motor protection processor, the second controller of the electric motor, and the second electric motor protection processor comprise separate cores of the multicore processor.

7. The controller of claim 6, wherein:

the first controller of the electric motor, the first electric motor protection processor, the second controller of the electric motor, and the second electric motor protection processor are configured to operate at a first clock speed;

the first thermal combustion engine controller, the first thermal engine protection processor, the second thermal combustion engine controller, and the second thermal engine protection processor are configured to operate at a second clock speed; and the first clock speed is ten or more times that of the second clock speed.

8. The controller of claim 1, wherein at least one of the first serial connection and the second serial connection comprises a controller area network bus (CANBUS) connection.

9. The controller of claim 1, wherein the electric motor control unit is configured, responsive to detecting an error in one or more of the first controller of the electric motor or the first electric motor protection processor, to switch control of the electric motor from the first electric motor control channel to the second electric motor control channel.

10. The controller of claim 1, wherein:

upon detection of an error condition in one or more of a thermal combustion engine or the electric motor, at least one of the first thermal engine protection processor or the second thermal engine protection processor is configured to output a kill command to at least one of the thermal combustion engine or the electric motor; and upon detection of the error condition in one or more of the thermal combustion engine or the electric motor, at least one of the first electric motor protection processor or the second electric motor protection processor is configured to output the kill command to at least one of the thermal combustion engine or the electric motor.

11. A hybrid-electric powertrain comprising:

a first electric motor;

one or more motor sensors configured to obtain sensor data of the first electric motor;

a thermal combustion engine;

one or more engine sensors configured to obtain sensor data of the thermal combustion engine; and a multicore hybrid-electric powertrain controller comprising:

an electric motor control unit comprising:

a first electric motor control channel comprising a first controller of the first electric motor and a first electric motor protection processor;

a second electric motor control channel comprising a second controller of the first electric motor and a second electric motor protection processor; and a switching driver connected to the first electric motor control channel and the second electric motor control channel, wherein the switching driver is configured to provide control inputs determined in at least one of the first electric motor control channel or the second electric motor control channel to the first electric motor;

a thermal engine control unit comprising:

a first engine control channel comprising a first thermal combustion engine controller and a first thermal engine protection processor;

a second engine control channel comprising a second thermal combustion engine controller and a second thermal engine protection processor; and an output drive connected to first engine control channel and the second engine control channel;

a first serial connection between the electric motor control unit and the thermal engine control unit, wherein the first serial connection is configured to pass control inputs and sensor data between the thermal engine control unit and the electric motor control unit;

a second serial connection between the electric motor control unit and the thermal engine control unit, wherein the second serial connection is configured to pass the control inputs and the sensor data between the thermal engine control unit and the electric motor control unit; and an analog/discrete connection between the electric motor control unit and the thermal engine control unit; and the first and second serial connections between the electric motor control unit and the thermal engine control unit is configured, as an independent communication path and the redundancy of analog/discrete connection; and the analog/discrete connection is configured, to provide faster protective functions, or responsive to failure of the first serial connection and the second serial connection, to pass the control inputs and the sensor data between the thermal engine control unit and the electric motor control unit.

12. The hybrid-electric powertrain of claim 11, further comprising a DC/AC inverter configured to power the first electric motor.

13. The hybrid-electric powertrain of claim 12, further comprising a second electric motor;

wherein the DC/AC inverter is a matrix inverter configured to power the first electric motor and the second electric motor.

14. The hybrid-electric powertrain of claim 11, wherein:

the first electric motor control channel is connected to the second electric motor control channel by one or more serial connections within the electric motor control unit; and the first engine control channel is connected to the second engine control channel by one or more serial connections within the thermal engine control unit.

15. The hybrid-electric powertrain of claim 14, wherein the first thermal combustion engine controller, the first thermal engine protection processor, the second thermal combustion engine controller, and the second thermal engine protection processor comprise separate cores of a multicore processor.

16. The hybrid-electric powertrain of claim 15, wherein the first controller of the first electric motor, the first electric motor protection processor, the second controller of the first electric motor, and the second electric motor protection processor comprise separate cores of the multicore processor.

17. The hybrid-electric powertrain of claim 16, wherein:

the first controller of the first electric motor, the first electric motor protection processor, the second controller of the first electric motor, and the second electric motor protection processor are configured to operate at a first clock speed;

the first thermal combustion engine controller, the first thermal engine protection processor, the second thermal combustion engine controller, and the second thermal engine protection processor are configured to operate at a second clock speed; and the first clock speed is ten or more times that of the second clock speed.

18. The hybrid-electric powertrain of claim 11, wherein at least one of the first serial connection and the second serial connection comprises a controller area network bus (CANBUS) connection.

19. The hybrid-electric powertrain of claim 11, wherein the electric motor control unit is configured, responsive to detecting an error in one or more of the first controller of the first electric motor or the first electric motor protection processor, to switch control of the first electric motor from the first electric motor control channel to the second electric motor control channel.

20. The hybrid-electric powertrain of claim 11, wherein:

upon detection of an error condition in one or more of the thermal combustion engine or the first electric motor, at least one of the first thermal engine protection processor or the second thermal engine protection processor is configured to output a kill command to at least one of the thermal combustion engine or the first electric motor; and upon detection of the error condition in one or more of the thermal combustion engine or the first electric motor, at least one of the first electric motor protection processor or the second electric motor protection processor is configured to output the kill command to at least one of the thermal combustion engine or the first electric motor.

* * * * *